United States Patent
Rathonyi et al.

(10) Patent No.: US 10,609,584 B2
(45) Date of Patent: Mar. 31, 2020

(54) SELECTION OF A CARRIER IN MULTI-CARRIER OPERATION SYSTEM

(71) Applicant: Telefonaktiebolaget LM Ericsson (publ), Stockholm (SE)

(72) Inventors: Béla Rathonyi, Lomma (SE); Andreas Höglund, Solna (SE); Ali Nader, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/757,684

(22) PCT Filed: Aug. 11, 2017

(86) PCT No.: PCT/EP2017/070524
§ 371 (c)(1),
(2) Date: Mar. 6, 2018

(87) PCT Pub. No.: WO2018/029375
PCT Pub. Date: Feb. 15, 2018

(65) Prior Publication Data
US 2018/0242179 A1    Aug. 23, 2018

Related U.S. Application Data

(60) Provisional application No. 62/374,699, filed on Aug. 12, 2016.

(51) Int. Cl.
*H04W 24/00*     (2009.01)
*H04W 24/08*     (2009.01)
(Continued)

(52) U.S. Cl.
CPC ......... *H04W 24/08* (2013.01); *H04W 52/265* (2013.01); *H04W 52/346* (2013.01);
(Continued)

(58) Field of Classification Search
None
See application file for complete search history.

(56) References Cited

U.S. PATENT DOCUMENTS

2015/0341911 A1   11/2015  Wakabayashi et al.
2016/0262109 A1*   9/2016  Chen ................. H04W 52/48
(Continued)

FOREIGN PATENT DOCUMENTS

WO     2016048044 A1      3/2016
WO  WO-2016048044 A1 *   3/2016   ............ H04L 5/0053
(Continued)

OTHER PUBLICATIONS

3GPP TSG RAN WG2 Meeting #93, Qualcomm, Discussion and Text Proposal on paging narrowband determination for eMTC, Feb. 2016, p. 3 (Year: 2016).*
(Continued)

*Primary Examiner* — Ayanah S George
(74) *Attorney, Agent, or Firm* — Coats + Bennett, PLLC

(57) ABSTRACT

Radio network devices (30, 31) operative in a wireless communication network are autonomously distributed among available narrowband carriers for receiving and transmitting messages from and to the network according to each device's (30, 31) required enhanced coverage level, and the enhanced coverage levels supported by each narrowband carrier. Information about the narrowband carriers, including at least which enhanced coverage levels each carrier supports, is broadcast in a cell. Additional information may also be broadcast. The radio network devices (30, 31) each independently ascertains its required enhanced coverage level, such as for example by measuring a received signal power and comparing it to one or more thresholds. The network and radio network device (30, 31) each determined one narrowband carrier, such as by applying a pre-
(Continued)

COVERAGE CLASS:

eMTC

NB-IoT determined function to parameters known to both the network and the radio network device (30, 31).

26 Claims, 6 Drawing Sheets

(51) Int. Cl.
*H04W 52/34* (2009.01)
*H04W 72/04* (2009.01)
*H04W 72/08* (2009.01)
*H04W 52/26* (2009.01)
*H04W 68/00* (2009.01)

(52) U.S. Cl.
CPC ..... *H04W 72/048* (2013.01); *H04W 72/0473* (2013.01); *H04W 72/085* (2013.01); *H04W 68/00* (2013.01); *H04W 72/0453* (2013.01)

(56) References Cited

U.S. PATENT DOCUMENTS

2017/0013574 A1* 1/2017 Zhu .................. H04W 48/08
2018/0069593 A1* 3/2018 Yi ..................... H04B 1/713
2018/0316464 A1* 11/2018 Stern-Berkowitz ....................... H04L 1/0034

FOREIGN PATENT DOCUMENTS

WO        2016184401 A1    11/2016
WO    WO-2016184401 A1 *  11/2016 ............. H04W 4/70
WO        2017133700 A1     8/2017

OTHER PUBLICATIONS

3GPP (3rd Generation Partnership Project); Technical Specification Group Radio Access Network; Evolved Universal Terrestrial Radio Access (E-UTRA); User Equipment (UE) procedures in idle mode (Release 13), 3GPP Standard; 3GPP TS 36.304, 3rd Generation Partnership Project (3GPP), Mobile Competence Centre; 650, Route Des Lucioles ; F-06921 Sophia-Antipolis Cedex ; France, vol. RAN WG2, No. V13.2.0, Jul. 1, 2016; (Jul. 1, 2016), pp. 1-46.

Qualcomm Incorporated: "Paging narrowband determination for eMTC", 3GPP Draft; R2-156822 Paging for EMTC, 3rd Generation Partnership Project (3GPP), Mobile Competence Centre; 650, Route Des Lucioles ; F-06921 Sophia-Antipolis Cedex ; France, vol. RAN WG2, No. Anaheim, USA; Nov. 16, 2015-Nov. 20, 2015 Nov. 7, 2015 (Nov. 7, 2015).

3GPP (3rd Generation Partnership Project); Technical Specification Group Radio Access Network; Evolved Universal Terrestrial Radio Access (EUTRA); Medium Access Control (MAC) protocol specification (Release 13), 3GPP Standard; 3GPP TS 36.321, 3rd Generation Partnership Project (3GPP), Mobile Competence Centre; 650, Route Des Lucioles ; F-06921 Sophia-Antipolis Cedex ; France, vol. RAN WG2, No. W13.2.0, Jul. 7, 2016 (Jul. 7, 2016), pp. 1-91.

Qualcomm Incorporated: "Discussion and Text Proposal on paging narrowband determination for eMTC", 3GPP Draft; R2-161957, Draft_TP Pagingnb_36 304, 3rd Generation Partnership Project (3GPP), Mobile Competence Centre; 650, Route Des Lucioles ; F-06921 Sophia-Antipolis Cedex ; France, vol. RAN WG2, No. St. Julian, Malta; Feb. 15, 2016-Feb. 19, 2016 Feb. 19, 2016 (Feb. 19, 2016).

Ericsson: "Non-anchor carrier Paging in NB-IoT", 3GPP Draft; R2-165657—NB-IOT Non-Anchor Paging, 3rd Generation Partnership Project (3GPP), Mobile Competence Centre; 650, Route Des Lucioles ; F-06921 Sophia-Antipolis Cedex ; France, vol. RAN WG2, No. Gothenburg, Sweden; Aug. 22, 2016-Aug. 26, 2016 Aug. 13, 2016 (Aug. 13, 2016).

Sharp: "Discussion on paging in eNB-IoT", 3GPP Draft; R2-166437 Discussion on Paging in ENB-IOT, 3rd Generation Partnership Project (3GPP), Mobile Competence Centre; 650, Route Des Lucioles ; F-06921 Sophia-Antipolis Cedex ; France, vol. RAN WG2, No. Kaohsiung, Taiwan; Oct. 10, 2016-Oct. 14, 2016 Oct. 9, 2016 (Oct. 9, 2016).

ZTE: "Further consideration on multi-carrier PRACH in NB-IoT", 3GPP Draft; R2-166074 Further Consideration on Multicarrier Prach in NB-IOT, 3rd Generation Partnership Project (3GPP), Mobile Competence Centre; 650, Route Des Lucioles ; F-06921 Sophia-Antipolis C, vol. RAN WG2, No. Kaohsiung; Oct. 10, 2016-Oct. 14, 2016 Oct. 9, 2016 (Oct. 9, 2016).

ETSI TS 136 331 v.13.2.0 (Oct. 2016); Technical Specification—LTE; Evolved Universal Terrestrial Radio Access (E-ULTRA); Radio Resource Control (RRC); Protocol specification (3GPP TS 36331 version 13.2.0 Release 13); ETSI, 650 Route des Lucioles, F-06921 Sophia Antipolis Cedex, France (Aug. 2016).

* cited by examiner

SELECTION OF A CARRIER IN MULTI-CARRIER OPERATION SYSTEM

RELATED APPLICATIONS

This application claims priority to U.S. Provisional Patent Application No. 62/374,699, titled Selection of a Carrier in Multi-Carrier Operation System, filed Aug. 12, 2016, the disclosure of which is incorporated herein by reference, in its entirety.

TECHNICAL FIELD

The present invention relates generally to wireless communication networks, and in particular to the distribution of radio network devices to carriers in a multi-carrier cell, considering enhanced coverage level requirements and support.

BACKGROUND

Narrowband Internet of Things (NB-IoT) is a narrowband system developed for cellular internet of things by 3GPP (3rd Generation Partnership Project). The system is based on existing LTE (Long Term Evolution) systems and addresses optimized network architecture and improved indoor coverage for massive numbers of radio network devices with following characteristics: low throughput (e.g., 2 kbps); low delay sensitivity (~10 seconds); ultra-low device cost (below 5 dollars); and low device power consumption (battery life of 10 years).

It is envisioned that each cell (~1 km$^2$) in this system will serve thousands (~50,000) of radio network devices such as sensors, meters, actuators, and the like. In order to be able to make use of existing spectrum for, e.g., GSM (Global System for Mobile Communications), a fairly narrow bandwidth has been adopted for NB-IoT technology. In particular, the bandwidth per carrier is one LTE Physical Resource Block (PRB), i.e., 12 subcarriers of 15 kHz each, or 180 kHz.

For Frequency Division Duplex (FDD) mode of NB-IoT (i.e., the transmitter and the receiver operate at different carrier frequencies), only half-duplex operation must be supported in the radio network device. In order to achieve improved coverage, data repetition is used as required, both in uplink (UL) and downlink (DL). The lower complexity of the radio network devices (e.g., only one transmission/receiver chain) means that some repetition might be needed also in normal coverage. Further, to alleviate radio network device complexity, the working assumption is to have cross-subframe scheduling. That is, a DL transmission is first scheduled on a Narrowband Physical DL Control Channel (NPDCCH) and then the first transmission of the actual data on the Narrowband Physical DL Shared Channel (NPDSCH) is carried out after the final transmission of the NPDCCH. Similarly, for UL data transmission, information about resources scheduled by the network and needed by the radio network device for UL transmission is first conveyed on the NPDCCH and then the first transmission of the actual data by the radio network device on the Narrowband Physical UL Shared Channel (NPUSCH) is carried out after the final transmission of the NPDCCH. In other words, for both cases above, there is no simultaneous reception of control channel and reception/transmission of data channel from the radio network device's perspective.

The NB-IoT radio frame length is the same as LTE, i.e., 10 ms and consists of 10 subframes. However, not all of the subframes are available for dedicated data communication in DL in an NB-IoT cell. The number of available subframes in the DL depends in part on which of three operation modes the NB-IoT is deployed in—Stand-alone, In-band, or Guard-band. For all operation modes, a radio network device must rate-match around numerous non-available subframes (or parts of subframe). These include NB-IoT primary and secondary synchronization channels (NPSS, and NSSS), where NPSS is transmitted in subframe 5 of every radio frame (NSSS transmission cycle is still to be defined in 3GPP). Non-available subframes also include the NB-IoT broadcast channel (NPBCH) containing the Master Information Block (MIB) occupying subframe 0 in every radio frame, and the NB-IoT system information blocks broadcast on NPDSCH (e.g., NSIB1 broadcast in the fourth subframe of every other radio frame). Still further non-available subframes include DL gaps when configured, and NB-IoT Reference Symbols (NRS). In addition, in the case of In-band operation mode, data cannot be transmitted where the LTE system, in which NB-IoT is deployed, transmits LTE reference symbols such as CRS (Cell-Specific Reference Signal) and PRS (Positioning Reference Signals), or in LTE MBSFN (Multicast-broadcast single-frequency network) subframes.

Due to the nature of NB-IoT with half-duplex communication, cross-subframe scheduling, low bandwidth, the available subframes, and the number of radio network devices to be served, it becomes evident that, as in all other wireless communication systems, NB-IoT will naturally benefit from utilizing more spectrum for efficient operation, especially if such spectrum is already available (e.g., in an in-band operation mode during low traffic hours when LTE carrier is not fully utilized). Therefore, in 3GPP Rel-13, NB-IoT multi-carrier operation has been adopted where the radio network devices operating in an NB-IoT anchor carrier are configured through higher layer signaling (Layer 3 RRC) to operate in an NB-IoT non-anchor carrier during connected mode operation. Because radio network devices do not need to search for non-anchor carriers, they are not constrained to be deployed on a 100 KHz raster, as the anchor carrier is. At the end of connected mode operation on a non-anchor carrier, the radio network device autonomously returns to the anchor carrier.

For 3GPP Rel-14, it has been proposed to extend this multi-carrier operation. According to one of the Rel-14 work item objectives, unlike Rel-13 operation, radio network devices shall be able to both monitor paging and perform Random Access on non-anchor carriers. Besides NB-IoT, numerous wireless communication networking standards provide for multi-carrier operation. In general, any time paging or Random Access is permitted on more than one carrier in a cell, radio network devices must be distributed among the available carriers in a deterministic manner. That is, both the network and each radio network device must agree as to which carrier each device will access. In NB-IoT and similar systems, such as enhanced Machine Type Communications (eMTC), where massive numbers of devices are anticipated, it is advantageous for the network and the radio network devices to independently come to the same conclusion of to which carrier each device is assigned, to avoid the massive signaling overhead that would result if each device had to be explicitly assigned to a carrier.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, radio network devices operative in a wireless communication network are autonomously distributed among available narrowband carriers for receiving and transmitting messages from and to the network according to each device's required enhanced coverage level, and the enhanced coverage levels supported by each narrowband carrier. Information about the narrowband carriers, including at least which enhanced coverage levels each carrier supports, is broadcast in a cell. Additional information may also be broadcast. The radio network devices each independently ascertains its required enhanced coverage level, such as for example by measuring a received signal power and comparing it to one or more thresholds. The network and radio network device each determine one narrowband carrier, such as by applying a predetermined function to parameters known to both the network and the radio network device.

One embodiment relates to a method, performed by a radio network device of selecting a narrowband carrier on which to receive or transmit a message. A required enhanced coverage level is determined. One narrowband carrier, on which to receive or transmit a message, is selected from a plurality of carriers supporting different enhanced coverage levels, based on the determined enhanced coverage level.

Another embodiment relates to a radio network device. The device includes an antenna and a transceiver operatively connected to the antenna. Processing circuitry is operatively connected to the transceiver and operative to determine a required enhanced coverage level; and select one narrowband carrier, on which to receive or transmit a message, from a plurality of carriers supporting different enhanced coverage levels, based on the determined enhanced coverage level.

Yet another embodiment relates to a non-transitory computer readable medium. The medium contains program instructions which, when executed in a radio network device, are operative to cause processing circuitry in the device to perform the steps of determining a required enhanced coverage level; and selecting one narrowband carrier, on which to receive or transmit a message, from a plurality of carriers supporting different enhanced coverage levels, based on the determined enhanced coverage level.

Another embodiment relates to a method, performed by a network node operative in wireless communication network, of determining a narrowband carrier on which to transmit messages to or receive messages from a first radio network device. Information about one or more available narrowband carriers, including at least an indication of the enhanced coverage levels supported on each narrowband carrier, is transmitted in a message on a narrowband carrier. One narrowband carrier, on which to transmit messages to or receive messages from the first radio network device, is determined from a plurality of carriers supporting different enhanced coverage levels, based on a determined enhanced coverage level requirement of the first radio network device.

Yet another embodiment relates to a network node operative in wireless communication network. The node includes one or more antennas and a transceiver operatively connected to an antenna. Processing circuitry is operatively connected to the transceiver and operative to transmit, in a message on a narrowband carrier, information about one or more available narrowband carriers including at least an indication of the enhanced coverage levels supported on each narrowband carrier; and determine one narrowband carrier, on which to transmit messages to or receive messages from the first radio network device, from a plurality of carriers supporting different enhanced coverage levels, based on a determined enhanced coverage level requirement of the first radio network device.

Still another embodiment relates to a non-transitory computer readable medium containing program instructions which, when executed in a network node operative in a wireless communication network, are operative to cause processing circuitry in the network node to perform the steps of: transmitting, in a message on a narrowband carrier, information about one or more available narrowband carriers including at least an indication of the enhanced coverage levels supported on each narrowband carrier; and determining one narrowband carrier, on which to transmit messages to or receive messages from the first radio network device, from a plurality of carriers supporting different enhanced coverage levels, based on a determined enhanced coverage level requirement of the first radio network device.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
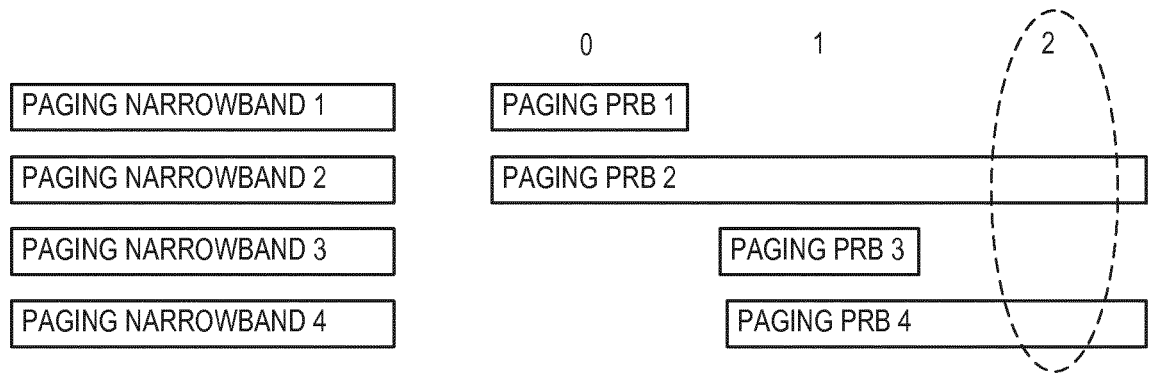
FIG. 1 is a diagram illustrating narrowband carriers supporting different enhanced coverage levels.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

As discussed above, one consideration in the design and operation of multi-carrier wireless communication networks is the distribution of radio network devices in a cell, in particular the distribution among an anchor carrier and various available non-anchor carriers. In some cases, an even distribution may not be desirable. For example in the enhanced Machine Type Communications (eMTC) specification, the paging load is evenly distributed over all available narrowband carriers (each six NRBs in the frequency domain) based on an ID associated with the radio network device. Due to this even distribution, radio network devices having large differences in coverage may be assigned to the same narrowband carrier. For example, a radio network device in good coverage (<140 dB MCL) and a radio network device in poor coverage (~164 dB MCL) may be assigned to the same narrowband carrier.

In NB-IoT, different narrowband carriers may have different levels of power boosting applied, meaning they transmit with greater radio signal strength. If a radio network device in poor coverage (e.g., located in the basement of a building) is assigned to a non-power boosted narrowband carrier, many more repetitions may be required to successfully transmit to the radio network device (e.g., a paging message) than if it were assigned to a power boosted narrowband carrier. The large number of repetitions required may result in the narrowband carrier being blocked for an extended time, thus blocking, e.g., paging occasions for other radio network devices, effectively increasing the paging blocking probability for the radio network device population in the NB-IoT cell.

In eMTC there is no difference in performance between the narrowband carriers on which radio network devices monitor paging. The standardized solution (Rel-13) for determining which narrowband carrier is monitored by a given radio network device is based on a uniform load distribution according to the following equation:

$$PNB = \text{floor}(ID/(N*Ns)) \bmod Nn, \text{ where} \quad (1)$$

PNB is the paging narrowband carrier; floor(•) is a function mapping a real number to the largest previous integer; ID is the International Mobile Subscriber Identity (IMSI), which is unique to every radio network device; N=min(T, nB) where where min(•) is a function returning the smallest value, T is the discontinuous reception (DRX) cycle length in radio frames, and nB can have values of {4T, 2T, T, T/2, T/4, T/8, T/16, T/32}; Ns=max(1, nB/T) where max(•) is a function returning the largest value; mod is the modulo operator yielding the remainder of a division operation; and Nn is the total number of paging narrowband carriers in the cell.

A significant difference between eMTC and NB-IoT is that in the latter, the narrowband carriers may differ from each other in several respects. First, there is one anchor narrowband carrier per cell, and may be one or more non-anchor narrowband carriers. The anchor narrowband carrier transmits NPSS/NSSS, NPBCH, and System Information (SI) broadcasts, and non-anchor narrowband carriers do not. Second, all 3GPP Rel-13 NB-IoT radio network devices will monitor paging and Msg2/Msg4 reception on the anchor narrowband carrier; accordingly, there may be a need to direct some of the Rel-14 radio network devices to non-anchor narrowband carriers. Third, in NB-IoT, one or more narrowband carriers can be power boosted. A typical choice would be the anchor narrowband carrier, which broadcasts SI, but also other narrowband carriers could be power boosted if enough eNB power is available. This means fewer repetitions will be needed to achieve a given coverage level on power boosted narrowband carriers, as compared to non-power boosted narrowband carriers.

3GPP Technical Specification (TS) 32.321 V13.2.0 (June 2016) defines three enhanced coverage levels for NB-IoT, numbered 0 to 2. Enhanced coverage levels allow poorly positioned radio network devices to receive traffic, either by increasing the transmit power (power boosting) or increasing the number of repetitions. It may be inefficient—and in some cases not even practical—for radio network devices with high enhanced coverage levels to be assigned to non-power boosted narrowband carriers. Doing so would increase the number of repetitions required, as compared to power boosted narrowband carriers, and would also increase radio network device power consumption due to the longer transmission time that results from the larger number of required repetitions.

According to embodiments of the present invention, information about which enhanced coverage levels are supported by each narrowband carrier is broadcast by the anchor narrowband carrier. Additionally, the anchor narrowband carrier may transmit information or parameters for the radio network device to be able to estimate the number of repetitions that will be required to decode for a certain enhanced coverage levels for each paging narrowband carrier. The latter information is necessary in case a different eNB output power is used for the paging narrowband carrier compared to what is used on the anchor narrowband carrier where the RSRP measurement is performed to determine the enhanced coverage level. One reason different narrowband carriers may support different enhanced coverage levels is that, as discussed above, in NB-IoT the power level of the one or more different carriers may also be different. That is, the transmission power used for one carrier may be different than the transmission power of another carrier.

FIG. 1 illustrates an example of having several paging narrowband carriers in a NB-IoT cell (referred to as "PRB" in FIG. 1, as NB-IoT carriers occupy one LTE PRB, or 180 kHz). In this example, the network broadcasts that carrier-1 supports enhanced coverage level 0; carrier-2 supports enhanced coverage levels 0, 1, and 2; carrier-3 supports enhanced coverage level 1; and carrier-4 supports enhanced coverage levels 1 and 2. A radio network device in "normal coverage," or enhanced coverage level 0 (determined by making RSRP measurements just before its Paging Opportunity), would then consider carrier-1 and carrier-2 as candidate narrowband carriers on which to monitoring paging. In the same way, a radio network device requiring enhanced coverage level 1 would consider carrier-2, carrier-3, and carrier-4 as candidates. Finally, a radio network device requiring enhanced coverage level 2 would consider carrier-2 and carrier-4 as candidates.

If an even paging load distribution is applied to each supported enhanced coverage level, a distribution similar to the eMTC solution (i.e., equation (1) above) could be applied to only the subset of narrowband carriers supporting that enhanced coverage level:

$$\text{PagingCarrier} = \text{floor}(ID/N) \bmod N_{CE}, \text{ where} \quad (2)$$

Nce is the number of carriers in the set of available narrowband carriers that support the particular enhanced coverage level, and the other parameters and functions have the same meaning as described above with reference to equation (1). Note that the ID may comprise the IMSI (International Mobile Subscriber Identification) assigned to a USIM (UMTS Subscriber Identity Module) card, or a value derived from the IMSI. For example, IMSI modulo $2^{14}$ yields the 14 least significant bits of the IMSI. Furthermore, any unique identifier of the radio network device may be used (or a value derived therefrom). For example, the IMEI (International Mobile Equipment Identity), a C-RNTI (Cell Radio Network Temporary Identifier), a GUTI (Globally Unique Temporary Identifier), an IP address, an ICID (IMS Charging Identifier), or the like may be used, so long as the network and a radio network device utilize the same identifier for that device.

With reference to the example described above with respect to FIG. 1, NCE=2 for enhanced coverage level 0; NCE=3 for enhanced coverage level 1; and NCE=2 for enhanced coverage level 2. Note that Ns is set to 1 to achieve an even distribution of radio network devices over all possible paging frames; also T=512 and nB=4*T in this example.

The different enhanced coverage level are determined, in one embodiment, by RSRP thresholds which broadcast in the cell, in a manner similar to the Rel-13 method for determining enhanced coverage levels for selecting an NPRACH resource (or equivalently NPRACH repetition factor). See 3GPP TS 36.321 V13.2.0 (June 2016) and 36.331 V13.2.0 (June 2016). In Rel-13 NB-IoT, up to three enhanced coverage level can be supported in a cell for NPRACH selection, similarly to the example above with reference to FIG. 1.

If three enhanced coverage levels are supported (i.e., 0, 1, and 2) then two Reference Signal Received Power (RSRP) threshold values must be broadcast. In general, the number of RSRP threshold values broadcast must be (at least) one less than the number of enhanced coverage levels supported. A radio network device makes an RSRP measurement (typically on the anchor narrowband carrier) and, based on this measured RSRP value and the broadcast RSRP thresholds, the radio network device determines its current enhanced coverage level requirement. In one embodiment, specific RSRP threshold levels for determining the enhanced coverage levels for paging are defined. In another embodiment, the same thresholds are used as are defined for NPRACH selection in Rel-13.

In one embodiment, after the network has determined the number of narrowband carriers to be used for paging, the appropriate enhanced coverage levels to be supported by each narrowband carrier are determined. This determination may be based on a number of factors, including one or more of: whether the narrowband carrier is the anchor; the output power used for the narrowband carrier; an estimate of dedicated traffic on the narrowband carrier; Intra- or inter-cell interference for the narrowband carrier; an estimate of the relative radio network device population with respect to 3GPP release in, e.g., a cell, cell cluster, tracking area, or PLMN (Public Land Mobile Network) (for example, 70% Rel-13 and 30% Rel-14); and the estimated radio network device population in the different enhanced coverage levels.

The network then broadcasts information about which enhanced coverage levels are supported for each narrowband carrier that is used for paging in the cell. In one embodiment, this comprises indicating which enhanced coverage levels or levels of NPDCCH repetitions are supported for each narrowband carrier. In one embodiment this comprises broadcasting a bitmap of the same length as the number of supported enhanced coverage levels, where a value 1 in a bit position means the corresponding enhanced coverage level is supported and 0 means enhanced coverage level is not supported. Referring again to the example above illustrated in FIG. 1, with three enhanced coverage levels, the following would be signaled: carrier-1=[100], carrier-2=[111], carrier-3=[010], and carrier-4=[011]. Then in addition the RSRP thresholds for determining the enhanced coverage level for paging are also broadcast in the cell.

As a further example, assume that RSRP measurement to determine the paging enhanced coverage level is performed on the anchor narrowband carrier. Also, paging on the anchor narrowband carrier is supported for all enhanced coverage levels, so that the number of NPDCCH repetitions for paging Rmax (in release-13 the parameter npdcch-NumRepetitionPaging-r13) is broadcast. Then if the same eNB output power is used for all available paging narrowband carriers, as compared to the anchor narrowband carrier output, then no additional parameters need to be broadcast for a radio network device to estimate the number of NPDCCH repetitions required to decode during a paging occasion.

On the other hand, if different eNB output power is used for one or more paging narrowband carriers than on the anchor carrier, then additional information (parameters) must be broadcast for those narrowband carriers in order for the radio network device to estimate the NPDCCH repetitions required during the paging occasion. In one embodiment, one such additional parameter is the transmit power difference, e.g., in units of dB, between the anchor narrowband carrier and each paging narrowband carrier, or a group of narrowband carriers having the same relative transmit power difference with respect to the anchor carrier. In one embodiment, the value range may span {−12 dB, −9 dB, −6 dB, 0 dB, 3 dB, 6 dB, 9 dB, 12 dB}. Note that positive values should also be possible in order to reduce the repetitions (and thus the power consumption) for poor coverage radio network devices. In one embodiment, another such additional parameter is a repetition compensation factor to be applied by the radio network device to the number of repetitions, compared to the estimated number of repetitions if the paging would have been received on the anchor carrier, e.g., with a value range of {¼, ½, ¾, 1, 2, 4}. In still other embodiments, parameters such a repetition level (for the NPDCCH) for each enhanced coverage level for the different paging narrowband carriers may be provided.

Figure 2:
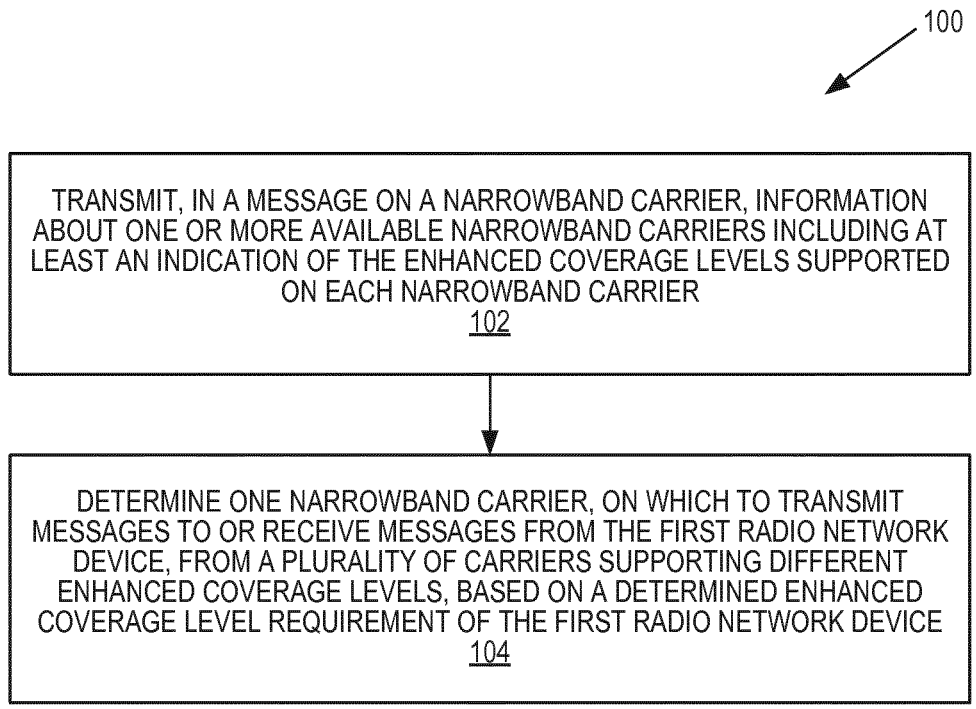
FIG. 2 is a flow diagram of a method of determining a narrowband carrier on which to transmit messages to or receive messages from a first radio network device.

FIG. 2 depicts a method 100, performed by a network node operative in wireless communication network, of determining a narrowband carrier on which to transmit messages to or receive messages from a first radio network device. Information about one or more available narrowband carriers, including at least an indication of the enhanced coverage levels supported on each narrowband carrier, is transmitted in a message on a narrowband carrier (block 102). In one embodiment, the indication comprises, for each available narrowband carrier, a bitmap of the same length as the number of supported enhanced coverage levels, as described above. One narrowband carrier, on which to transmit messages to or receive messages from the first radio network device, is determined from a plurality of carriers supporting different enhanced coverage levels, based on a determined enhanced coverage level requirement of the first radio network device (block 104).

In one embodiment the information about one or more available narrowband carriers is transmitted in a broadcast message on an anchor narrowband carrier. In one embodiment, the information about one or more available narrowband carriers also includes the number NCE of available narrowband carriers. In one embodiment, the one narrowband carrier on which to transmit messages to or receive messages from the first radio network device is determined by first determining a set of available narrowband carriers that support the determined enhanced coverage level requirement of the first radio network device; and then selecting one narrowband carrier from the set by applying a predetermined function to parameters known to both the radio network device and the network. The predetermined function and known parameters may be equation (2) described above. In one embodiment, the method 100 further comprises estimating a number of repetitions required for the first radio network device to receive, e.g., a paging message transmitted on the determined narrowband carrier, and then transmitting the message using the estimated number of repetitions.

A radio network device according to embodiments of the present invention would perform the following steps at a paging comparison. First, the radio network device receives RSRP threshold values from a broadcast message, such as from the anchor narrowband carrier. The radio network device performs an RSRP measurement, such as on the anchor narrowband carrier, and compares the value to the RSRP thresholds to determine a required enhanced coverage level. The radio network device determines, from information broadcast in the NB-IoT cell, a set of available narrowband carriers (e.g., anchor and non-anchor) that support the required enhanced coverage level. The radio network device selects one such available narrowband carrier based on a paging load distribution formula, such as equation (2). The radio network device estimates the number of repetitions needed to receive a message on the selected narrowband carrier, and then receives a message (e.g., a paging message) on the selected narrowband carrier using the selected number of repetitions.

Figure 3:
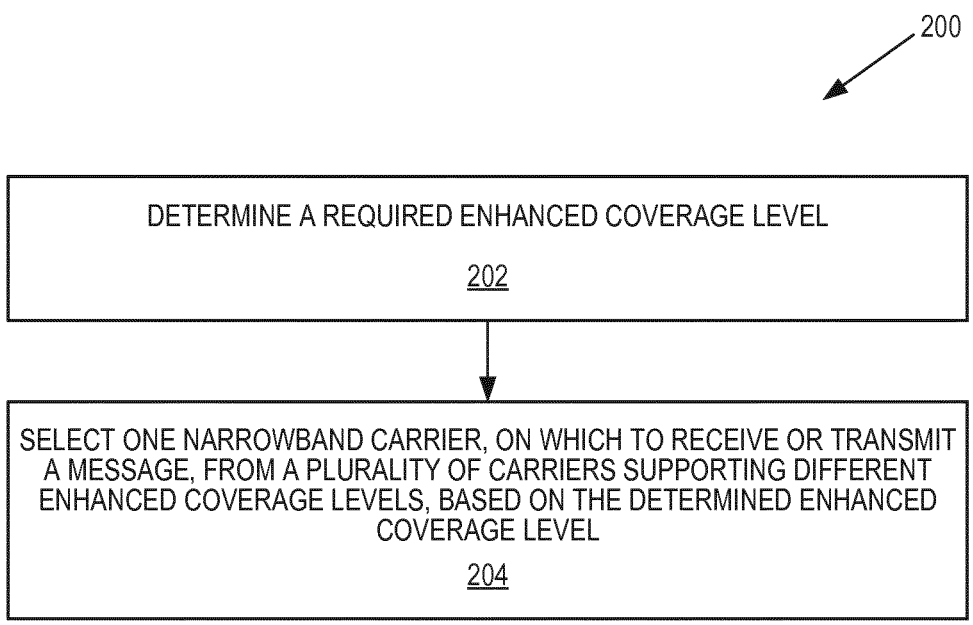
FIG. 3 is a flow diagram of a method of selecting a narrowband carrier on which to receive or transmit a message.

FIG. 3 depicts a method 200, performed by a radio network device of selecting a narrowband carrier on which to receive or transmit a message. A required enhanced coverage level is determined (block 202). One narrowband carrier, on which to receive or transmit a message, is selected from a plurality of carriers supporting different enhanced coverage levels, based on the determined enhanced coverage level (block 204).

In one embodiment, determining a required enhanced coverage level comprises measuring received signal power from a narrowband carrier and comparing it to one or more received signal power thresholds. In one embodiment, selecting one narrowband carrier on which to receive or transmit a message comprises first determining a set of available narrowband carriers that support the determined enhanced coverage level, and then selecting one narrowband carrier from the set by applying a predetermined function to parameters known to both the radio network device and the network. The predetermined function and known parameters may be equation (2) described above. In one embodiment, the method 200 further comprises estimating a number of repetitions required to receive a downlink message (e.g., a paging message) on the selected narrowband carrier, and then receiving the downlink message on the selected narrowband carrier using the estimated number of repetitions.

In the embodiment described above, the up to three supported enhanced coverage levels are common for all available narrowband carriers, and it is only indicated per carriers which levels are supported. In another embodiment, the enhanced coverage levels are defined individually per narrowband carrier (although this may complicate the narrowband carrier determination for a particular radio network device).

When the eNB receives the paging message for a particular UE from a Memory Management Entity (MME), depending on network implementation and possibly indication of the radio network device's previous coverage situation, it will determine a repetition level for paging the radio network device. Based on which narrowband carriers support this enhanced coverage level and the 3GPP release version the radio network device supports, the eNB will then determine the paging narrowband carrier for the UE, e.g., based on equation (2) above, setting NCE to the number of narrowband carriers supporting this coverage level.

Note that, since the radio network device determines its enhanced coverage level from comparing RSRP measurements to broadcast RSRP threshold values, it is possible that the radio network device may determine a different enhanced coverage level than the network. For example, if the radio network device has been moved from a location having poor coverage to a location having better coverage, if something previously blocking or interfering with radio waves is moved or deactivated, or the like, the radio network device may experience better coverage conditions and hence determine a lower required enhanced coverage level. In the vast majority of anticipated NB-IoT use cases, this is not expected to occur often, if at all. In such cases, in one embodiment, the eNB may systematically assume the radio network device to be in a different enhanced coverage level and repeat the narrowband carrier selection process for all possible enhanced coverage levels. Alternatively, or additionally if this approach fails, the failure of a User Equipment (UE) to respond to a page is a well-known problem in the wireless communication arts, and amelioration procedures are well established (e.g., successively expand the paging message to more carriers, the entire cell, a cell cluster, tracking area, PLMN, and the like).

Figure 4:
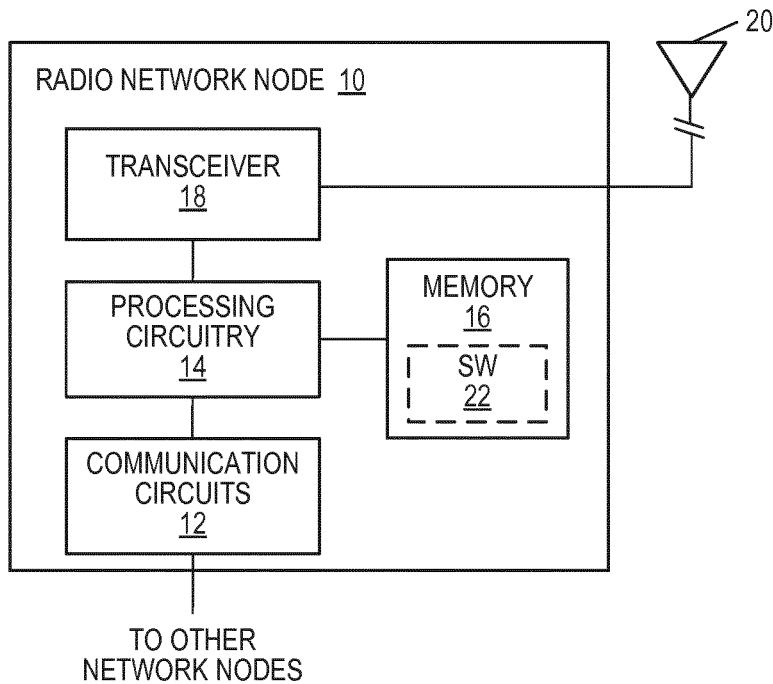
FIG. 4 is a block diagram of a radio network node.

FIG. 4 depicts a radio network node 10 operative in a wireless communication network. The radio network node 10 includes communication circuits 12 operative to exchange data with other network nodes; processing circuitry 14; memory 16; and radio circuits, such as a transceiver 18, one or more antennas 20, and the like, to effect wireless communication across an air interface to one or more radio network devices. As indicated by the broken connection to the antenna(s) 20, the antenna(s) may be physically located separately from the radio network node 10, such as mounted on a tower, building, or the like. Although the memory 16 is depicted as being separate from the processing circuitry 14, those of skill in the art understand that the processing circuitry 14 includes internal memory, such as a cache memory or register file. Those of skill in the art additionally understand that virtualization techniques allow some functions nominally executed by the processing circuitry 14 to actually be executed by other hardware, perhaps remotely located (e.g., in the so-called "cloud").

According to embodiments of the present invention, the memory 16 is operative to store, and the processing circuitry 14 is operative to execute, software 22 which when executed is operative to cause the radio network node 10 to determine a narrowband carrier on which to transmit messages to or receive messages from a particular radio network device, as described and claimed herein. In particular, the software 22, when executed on the processing circuitry 14, is operative to perform the method 100 described and claimed herein. This allows the radio network node 10 to optimize the allocation of radio network devices among available narrowband carriers according to the enhanced coverage level requirements of the radio network devices.

Figure 5:
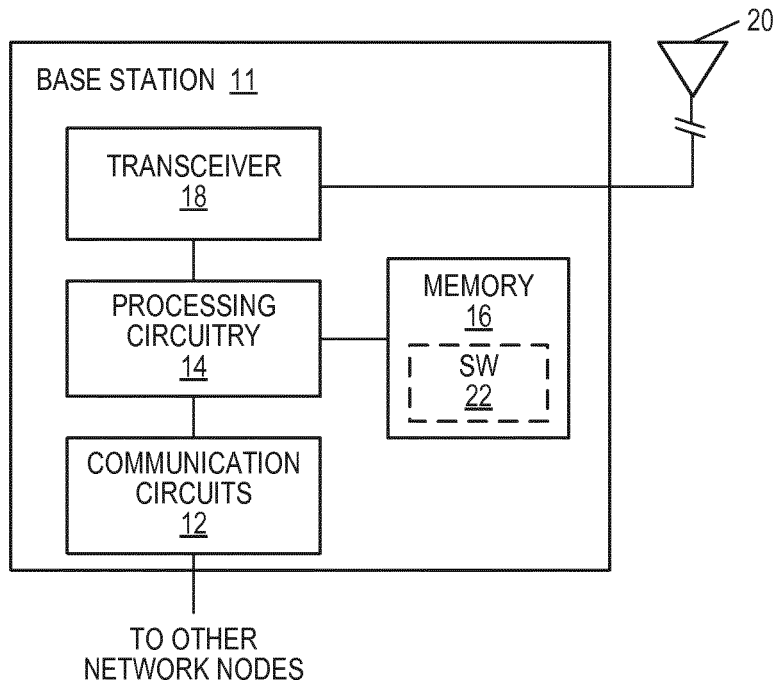
FIG. 5 is a block diagram of a base station.

FIG. 5 depicts an embodiment in which the radio network node 10 of FIG. 4 is a base station 11 providing wireless communication services to one or more radio network devices in a geographic region (known as a cell or sector). A base station in LTE is called an e-NodeB or eNB; however the present invention is not limited to LTE or eNBs.

Figure 6:
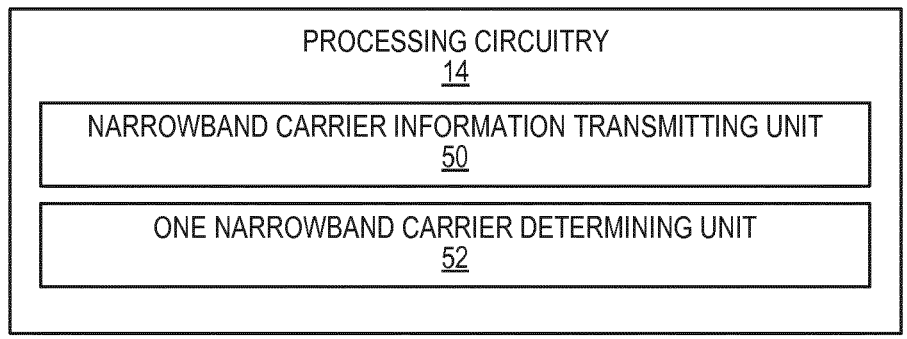
FIG. 6 is a diagram of physical units in processing circuitry in the network node of FIG. 4.

FIG. 6 illustrates example processing circuitry 14, such as that in the radio network node 10 of FIG. 4. The processing circuitry 14 comprises a plurality of physical units. In particular, the processing circuitry 14 comprises a narrowband carrier information transmitting unit 50 and a one narrowband carrier determining unit 52. The narrowband carrier information transmitting unit 50 is configured to transmit, in a message on a narrowband carrier, information about one or more available narrowband carriers including at least an indication of the enhanced coverage levels supported on each narrowband carrier. The one narrowband carrier determining unit 52 is configured to determine one narrowband carrier, on which to transmit messages to or receive messages from the first radio network device, from a plurality of carriers supporting different enhanced coverage levels, based on a determined enhanced coverage level requirement of the first radio network device.

Figure 7:
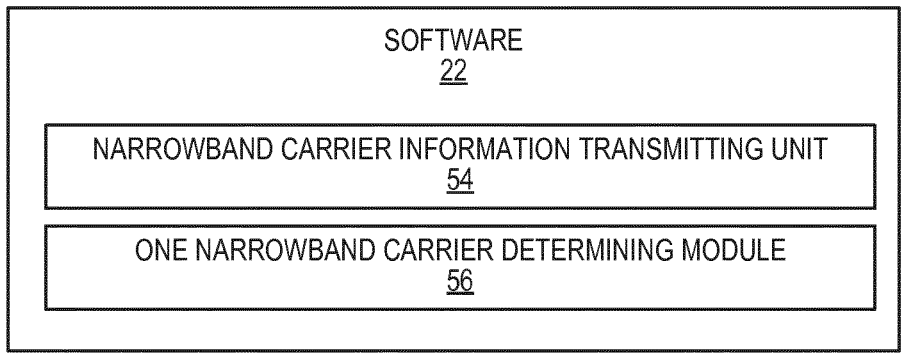
FIG. 7 is a diagram of software modules in memory in the network node of FIG. 4.

FIG. 7 illustrates example software 22, such as that depicted in the memory 16 of the radio network node 10 of FIG. 4. The software 22 comprises a plurality of software modules. In particular, the software 22 comprises a narrowband carrier information transmitting module 54 and a one narrowband carrier determining unit 56. The narrowband carrier information transmitting unit 54 is configured to cause the processing circuitry 14 to transmit, in a message on a narrowband carrier, information about one or more available narrowband carriers including at least an indication of the enhanced coverage levels supported on each narrowband carrier. The one narrowband carrier determining unit 56 is configured to cause the processing circuitry 14 to determine one narrowband carrier, on which to transmit messages to or receive messages from the first radio network device, from a plurality of carriers supporting different enhanced coverage levels, based on a determined enhanced coverage level requirement of the first radio network device.

Figure 8:
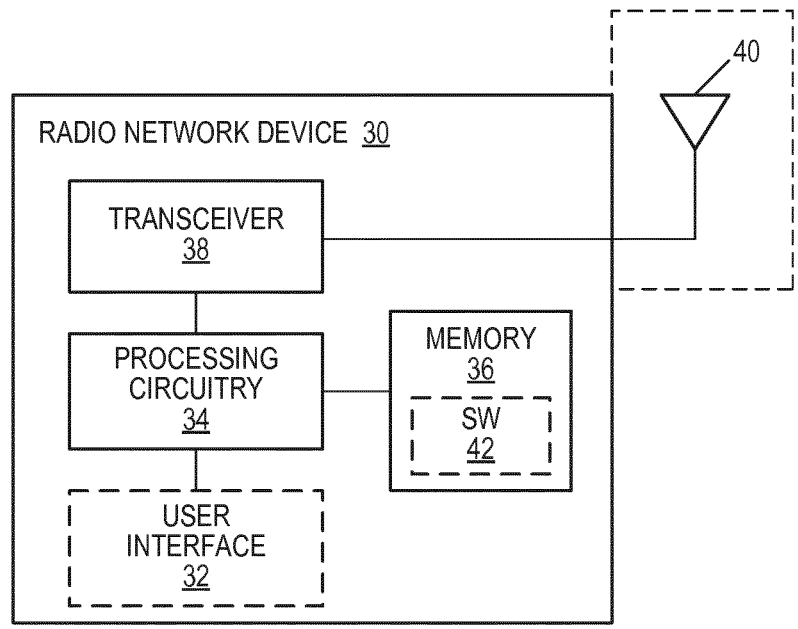
FIG. 8 is a block diagram of a radio network device.

FIG. 8 depicts a radio network device 30 operative in embodiments of the present invention. A radio network device 30 is any type device capable of communicating with a radio network node 10 and/or base station 11 over radio signals. A radio network device 30 may therefore refer to a machine-to-machine (M2M) device, a machine-type communications (MTC) device, a Narrowband Internet of Things (NB-IoT) device, etc. The radio network device may also be a User Equipment (UE); however it should be noted that the UE does not necessarily have a "user" in the sense of an individual person owning and/or operating the device. A radio network device may also be referred to as a radio device, a radio communication device, a wireless communication device, a wireless terminal, or simply a terminal—unless the context indicates otherwise, the use of any of these terms is intended to include device-to-device UEs or devices, machine-type devices or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be configured to transmit and/or receive data without direct human interaction.

A radio network device 30 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

In some embodiments, the radio network device 30 includes a user interface 32 (display, touchscreen, keyboard or keypad, microphone, speaker, and the like); in other embodiments, such as in many M2M, MTC, or NB-IoT scenarios, the radio network device 30 may include only a minimal, or no, user interface 32 (as indicated by the dashed lines of block 32 in FIG. 8). The radio network device 30 also includes processing circuitry 34; memory 36; and radio circuits, such a transceiver 38, one or more antennas 40, and the like, to effect wireless communication across an air interface to one or more radio network nodes 10. As indicated by the dashed lines, the antenna(s) 40 may protrude externally from the radio network device 30, or the antenna(s) 40 may be internal.

According to embodiments of the present invention, the memory 36 is operative to store, and the processing circuitry 34 operative to execute, software 42 which when executed is operative to cause the radio network device 30 to determine a required enhanced coverage level and select an available narrowband carrier supporting that enhanced coverage level, on which to receive and transmit messages, as described and claimed herein. In particular, the software 42, when executed on the processing circuitry 34, is operative to perform the method 200 described and claimed herein. This allows the radio network device 30, to select the a narrowband carrier for receiving and transmitting messages without requiring excessive repetition, which ties up system resources and consumes power in the radio network device 30.

Figure 9:
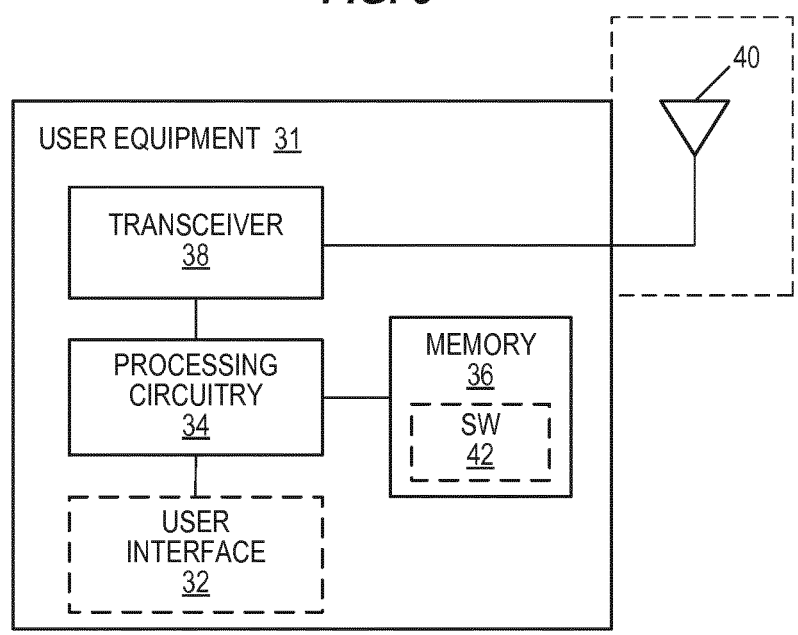
FIG. 9 is a block diagram of a user equipment.

FIG. 9 depicts an embodiment in which the radio network device 30 is a User Equipment (UE) 31. In some embodiments, the UE 31 may additionally include features such as a camera, removable memory interface, short-range communication interface (Wi-Fi, Bluetooth, and the like), wired interface (USB), battery recharge port, and the like (these features are not shown in FIG. 9).

Figure 10:
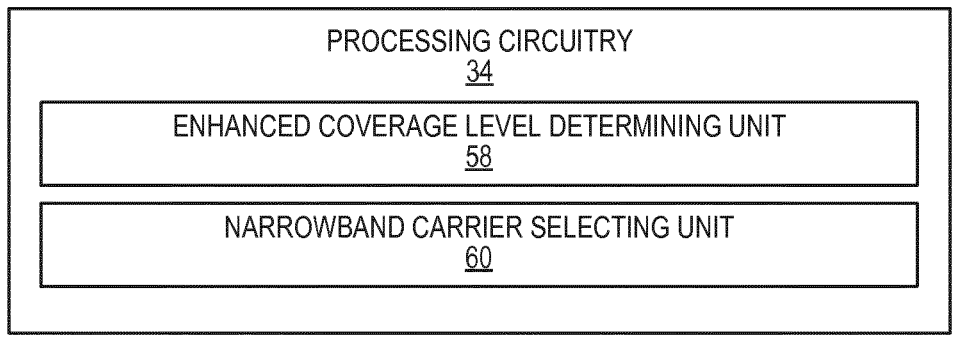
FIG. 10 is a diagram of physical units in processing circuitry in the network radio device of FIG. 8.

FIG. 10 illustrates example processing circuitry 34, such as that in the radio network device 30 of FIG. 8. The processing circuitry 34 comprises a plurality of physical units. In particular, the processing circuitry 34 comprises an enhanced coverage level determining unit 58 and a narrowband carrier selecting unit 60. The enhanced coverage level determining unit 58 is configured to determine an enhanced coverage level required by the radio network device 30. The narrowband carrier selecting unit 60 is configured to select one narrowband carrier, on which to receive or transmit a message, from a plurality of carriers supporting different enhanced coverage levels, based on the determined enhanced coverage level.

Figure 11:
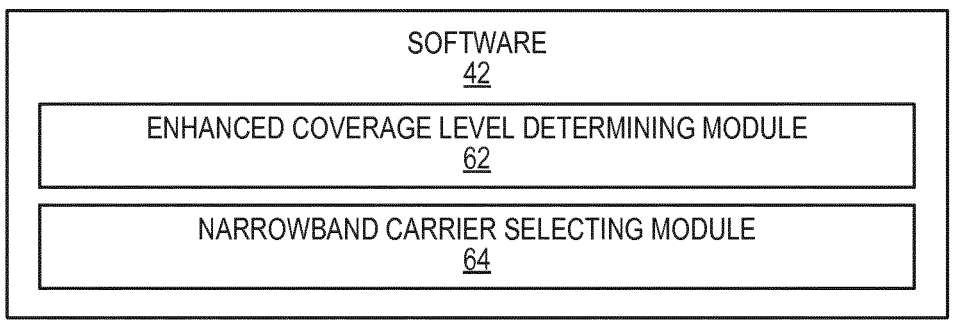
FIG. 11 is a diagram of software modules in memory in the network radio device of FIG. 8.

FIG. 11 illustrates example software 42, such as that depicted in the memory 36 of the radio network device 30 of FIG. 8. The software 42 comprises a plurality of software modules. In particular, the software 42 comprises an enhanced coverage level determining module 62 and a narrowband carrier selecting unit 64. The enhanced coverage level determining module 62 is configured to cause the processing circuitry 34 determine an enhanced coverage level required by the radio network device 30. The narrowband carrier selecting module 64 is configured to cause the processing circuitry 34 to select one narrowband carrier, on which to receive or transmit a message, from a plurality of carriers supporting different enhanced coverage levels, based on the determined enhanced coverage level.

In all embodiments, the processing circuitry 14, 34 may comprise any sequential state machine operative to execute machine instructions stored as machine-readable computer programs in memory 16, 36, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 16, 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuits may comprise one or more transceivers 18, 38 used to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, or the like. The transceiver 18, 38 implements transmitter and receiver functionality appropriate to the RAN links (e.g., frequency allocations and the like). The transmitter and receiver functions may share circuit components and/or software, or alternatively may be implemented separately.

In all embodiments, the communication circuits 12 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 12 implement receiver and transmitter functionality appropriate to the communication network links (e.g., optical, electrical, and the like). The transmitter and receiver functions may share circuit components and/or software, or alternatively may be implemented separately.

Embodiments of the present invention present numerous advantages over the prior art. Not all narrowband carriers deployed in a cell need to support transmissions at all possible enhanced coverage levels. For example, all radio network devices in good coverage may monitor/receive traffic on certain narrowband carriers where poor coverage radio network devices will not monitor/receive traffic. This may increase the channel utilization efficiency and reduce, e.g., paging blocking probability as paging record multiplexing could be applied. Embodiments of the invention are particularly useful if certain narrowband carriers will have different eNB output power (i.e. be power boosted) in a NB-IoT cell (e.g., the anchor narrowband carriers of the cell and potentially a limited number of additional non-anchor narrowband carriers are power boosted), and therefore the number of repetitions for an enhanced coverage level need not be the same for all narrowband carriers. For example, paging radio network devices having the highest enhanced coverage level requirement only on power boosted carrier(s) could eliminate the need for a large number of repetitions and thereby reduce the power consumption for the radio network device, as well as reduce the system resource utilization for the network.

For clarity of explanation and to provide a specific context to assist those of skill in the art in understanding, embodiments of the present invention have been described herein in the specific context of paging in a NB-IoT network. However, neither aspect of this specific context should be construed as a limitation of embodiments of the present invention. In general, embodiments of the invention will find utility in any multi-carrier wireless communication network, wherein it is advantageous to consider enhanced coverage level in the distribution of radio network devices to carriers. Furthermore, this distribution may, in general, be operative for the transmission and/or reception of any message—whether user plane data or overhead signaling—and is not limited to paging operations. Those of skill in the art may advantageously apply embodiments of the present invention in various wireless communication networks for various operations, given the teachings of the present disclosure.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a radio network device of selecting a narrowband carrier on which to receive or transmit a message, comprising:
   determining a required enhanced coverage level; and
   selecting one narrowband carrier, on which to receive or transmit a message, from a plurality of carriers supporting different enhanced coverage levels, based on the determined enhanced coverage level by applying a predetermined function to one or more predetermined parameters, wherein the predetermined function calculates an index identifying the narrowband carrier from the plurality of carriers supporting the different enhanced coverage levels, and wherein the one or more predetermined parameters are known to both the radio network device and a network node such that the narrowband carrier is also selected by the network node independently of the radio network device.

2. The method of claim 1 wherein the plurality of carriers support different enhanced coverage levels by one or both of transmitting at different power levels and transmitting using different numbers of repetitions.

3. The method of claim 1 wherein determining a required enhanced coverage level comprises measuring received signal power from a narrowband carrier and comparing it to one or more received signal power thresholds.

4. The method of claim 1 wherein selecting one narrowband carrier on which to receive or transmit a message comprises:
   determining a set of available narrowband carriers that support the determined enhanced coverage level;

wherein selecting the one narrowband carrier comprises selecting the one narrowband carrier from the set of available narrowband carriers.

5. The method of claim 4 wherein the one or more predetermined parameters known to both the radio network device and the network include a parameter derived from a unique identifier of the device.

6. The method of claim 4 wherein the one or more predetermined parameters known to both the radio network device and the network include the number of carriers in the determined set of available narrowband carriers that support the determined enhanced coverage level.

7. The method of claim 4 wherein the predetermined function is PagingCarrier=floor(ID/N) mod Nce, where PagingCarrier is an index identifying a carrier in the set of available narrowband carriers that support the determined enhanced coverage level;

floor(•) is a function mapping a real number to the largest previous integer;

ID is a parameter derived from a unique identifier of the device;

N=min(T, nB) where min(•) is a function returning the smallest value, T is the discontinuous reception (DRX) cycle length in radio frames, and nB can have values of {4T, 2T, T, T/2, T/4, T/8, T/16, T/32};

mod is the modulo operator yielding the remainder of a division operation; and

Nce is the number of carriers in the set of available narrowband carriers that support the determined enhanced coverage level.

8. The method of claim 7 wherein ID=IMSI mod $2^n$ where IMSI is the International Mobile Subscriber Identity; and n=a number of desired least significant bits of the IMSI.

9. A radio network device, comprising:

an antenna;

a transceiver operatively connected to the antenna; and processing circuitry operatively connected to the transceiver and operative to determine a required enhanced coverage level; and select one narrowband carrier, on which to receive or transmit a message, from a plurality of carriers supporting different enhanced coverage levels, based on the determined enhanced coverage level by applying a predetermined function to one or more predetermined parameters, wherein the predetermined function calculates an index identifying the narrowband carrier from the plurality of carriers supporting the different enhanced coverage levels, and wherein the one or more predetermined parameters are known to both the radio network device and a network node such that the narrowband carrier is also selected by the network node independently of the radio network device.

10. The device of claim 9 wherein the plurality of carriers support different enhanced coverage levels by one or both of transmitting at different power levels and transmitting using different numbers of repetitions.

11. The device of claim 9 wherein the processing circuitry is operative to determine a required enhanced coverage level by measuring received signal power from a narrowband carrier and comparing it to one or more received signal power thresholds.

12. The device of claim 9 wherein the processing circuitry is operative to select one narrowband carrier on which to receive or transmit a message by:

determining a set of available narrowband carriers that support the determined enhanced coverage level; and wherein selecting the one narrowband carrier comprises selecting the one narrowband carrier from the set.

13. The device of claim 12 wherein the one or more predetermined parameters known to both the radio network device and the network include a parameter derived from a unique identifier of the device.

14. The device of claim 12 wherein the one or more predetermined parameters known to both the radio network device and the network include the number of carriers in the determined set of available narrowband carriers that support the determined enhanced coverage level.

15. A method, performed by a network node operative in wireless communication network, of determining a narrowband carrier on which to transmit messages to or receive messages from a first radio network device, comprising:

transmitting, in a message on a narrowband carrier, information about one or more available narrowband carriers including at least an indication of the enhanced coverage levels supported on each narrowband carrier; and selecting one narrowband carrier, on which to transmit messages to or receive messages from the first radio network device, from a plurality of carriers supporting different enhanced coverage levels, based on a determined enhanced coverage level requirement of the first radio network device by applying a predetermined function to one or more predetermined parameters, wherein the predetermined function calculates an index identifying the narrowband carrier from the plurality of carriers supporting the different enhanced coverage levels, and wherein the one or more predetermined parameters are known to both the first radio network device and the network such that the narrowband carrier is also selected by the first radio network device independently of the network node.

16. The method of claim 15 wherein the plurality of carriers support different enhanced coverage levels by one or both of transmitting at different power levels and transmitting using different numbers of repetitions.

17. The method of claim 15 wherein the information about one or more available narrowband carriers is transmitted in a broadcast message on an anchor narrowband carrier.

18. The method of claim 15 wherein the information about one or more available narrowband carriers also includes the number of available narrowband carriers.

19. The method of claim 15 wherein selecting one narrowband carrier on which to transmit messages to or receive messages from the first radio network device comprises;

determining a set of available narrowband carriers that support the determined enhanced coverage level requirement of the first radio network device.

20. The method of claim 19 wherein the one or more predetermined parameters known to both the first radio network device and the network include a parameter derived from a unique identifier of the first radio network device.

21. A network node operative in wireless communication network, comprising:

one or more antennas;

a transceiver operatively connected to an antenna; and processing circuitry operatively connected to the transceiver and operative to transmit, in a message on a narrowband carrier, information about one or more available narrowband carriers including at least an indication of the enhanced coverage levels supported on each narrowband carrier; and select one narrowband carrier, on which to transmit messages to or receive messages from a first radio network device, from a plurality of carriers supporting different enhanced coverage levels, based on a determined enhanced coverage level requirement of the first radio network device by applying a predetermined function to one or more predetermined parameters, wherein the predetermined function calculates an index identifying the narrowband carrier from the plurality of carriers supporting the different enhanced coverage levels, and wherein the one or more predetermined parameters are known to both the first radio network device and the network such that the narrowband carrier is also selected by the first radio network device independently of the network node.

22. The network node of claim 21 wherein the plurality of carriers support different enhanced coverage levels by one or both of transmitting at different power levels and transmitting using different numbers of repetitions.

23. The network node of claim 21 wherein the processing circuitry is operative to transmit information about one or more available narrowband carriers by transmitting the information in a broadcast message on an anchor narrowband carrier.

24. The network node of claim 21 wherein the processing circuitry is operative to select one narrowband carrier on which to transmit messages to or receive messages from the first radio network device by;

determining a set of available narrowband carriers that support the determined enhanced coverage level requirement of the first radio network device.

25. The network node of claim 24 wherein the one or more predetermined parameters known to both the first radio network device and the network include a parameter derived from a unique identifier of the first radio network device.

26. A non-transitory computer readable medium, containing program instructions which, when executed in a network node operative in a wireless communication network, are operative to cause processing circuitry in the network node to perform the steps of:

transmitting, in a message on a narrowband carrier, information about one or more available narrowband carriers including at least an indication of the enhanced coverage levels supported on each narrowband carrier; and selecting one narrowband carrier, on which to transmit messages to or receive messages from a first radio network device, from a plurality of carriers supporting different enhanced coverage levels, based on a determined enhanced coverage level requirement of the first radio network device by applying a predetermined function to one or more predetermined parameters, wherein the predetermined function calculates an index identifying the narrowband carrier from the plurality of carriers supporting the different enhanced coverage levels, and wherein the one or more predetermined parameters are known to both the first radio network device and the network such that the narrowband carrier is also selected by the first radio network device independently of the network node.

* * * * *